United States Patent
Li et al.

(10) Patent No.: US 10,671,361 B2
(45) Date of Patent: Jun. 2, 2020

(54) AUTOMATICALLY DETERMINING DATA DEPENDENCIES TO FACILITATE CODE EXECUTION

(71) Applicant: PAYPAL, INC., San Jose, CA (US)

(72) Inventors: Xin Li, Shanghai (CN); Weijia Deng, Shanghai (CN); Shuan Yang, Shanghai (CN); Feng Chen, Shanghai (CN); Jin Yao, Shanghai (CN); Zhijun Ling, Shanghai (CN); Yunfeng Li, Shanghai (CN); Xiaohan Yun, Shanghai (CN); Yang Yu, Shanghai (CN)

(73) Assignee: PayPal, Inc., San Jose, CA (US)

( * ) Notice: Subject to any disclaimer, the term of this patent is extended or adjusted under 35 U.S.C. 154(b) by 15 days.

(21) Appl. No.: 15/333,869

(22) Filed: Oct. 25, 2016

(65) Prior Publication Data
US 2018/0113686 A1  Apr. 26, 2018

(51) Int. Cl.
*G06F 8/41* (2018.01)

(52) U.S. Cl.
CPC .............. *G06F 8/433* (2013.01); *G06F 8/427* (2013.01); *G06F 8/4441* (2013.01); *G06F 8/45* (2013.01)

(58) Field of Classification Search
CPC ......... G06F 8/433; G06F 8/427; G06F 8/4441
USPC ....................................................... 717/143
See application file for complete search history.

(56) References Cited

U.S. PATENT DOCUMENTS

| | | | |
|---|---|---|---|
| 6,678,796 B1 * | 1/2004 | Kosche | G06F 8/4442 711/137 |
| 9,489,180 B1 * | 11/2016 | Baskaran | G06F 8/447 |
| 9,727,377 B2 * | 8/2017 | Martinez Canedo | G06F 9/4881 |
| 2002/0066005 A1 * | 5/2002 | Shibayama | G06F 9/3834 712/218 |
| 2004/0103410 A1 * | 5/2004 | Sakai | G06F 8/456 717/146 |
| 2004/0172626 A1 * | 9/2004 | Jalan | G06F 8/456 717/149 |
| 2005/0096942 A1 * | 5/2005 | Shachor | G06F 3/0611 705/2 |
| 2008/0162889 A1 * | 7/2008 | Cascaval | G06F 9/3834 712/216 |

(Continued)

*Primary Examiner* — Lewis A Bullock, Jr.
*Assistant Examiner* — Theodore E Hebert
(74) *Attorney, Agent, or Firm* — Haynes and Boone LLP (57) ABSTRACT

Technologies relating to determining data variable dependencies to facilitate code execution are disclosed. An example method includes: identifying a set of programming statements having a plurality of data parameters; identifying first data parameters associated with a first programming statement in the set of programming statements; determining one or more parameter dependencies associated with the first data parameters; and determining, based on the one or more parameter dependencies, a first execution performance of the first programming statement. The method may further include: determining a second execution performance of the second programming statement and scheduling execution of the first programming statement and of the second programming statement based on the first and second execution performances. For example, at least a portion of the first programming statement is executed in parallel to executing the second programming statement, or the first programming statement and the second programming statement are executed in a predefined sequence.

20 Claims, 6 Drawing Sheets

(56) References Cited

U.S. PATENT DOCUMENTS

| | | | | |
|---|---|---|---|---|
| 2008/0250232 A1* | 10/2008 | Nakashima | ............ | G06F 9/3808 712/225 |
| 2009/0138862 A1* | 5/2009 | Tanabe | .................... | G06F 8/456 717/149 |
| 2012/0079467 A1* | 3/2012 | Tojo | ........................ | G06F 8/452 717/150 |
| 2012/0167069 A1* | 6/2012 | Lin | ........................ | G06F 8/456 717/160 |
| 2013/0024849 A1* | 1/2013 | Baba | ...................... | G06F 8/433 717/150 |
| 2013/0326532 A1* | 12/2013 | Fujimaki | .................. | G06F 9/50 718/104 |
| 2014/0096117 A1* | 4/2014 | Tanaka | .................... | G06F 8/434 717/149 |
| 2014/0304491 A1* | 10/2014 | Kasahara | ................ | G06F 13/28 712/42 |
| 2014/0372995 A1* | 12/2014 | Mori | ....................... | G06F 8/452 717/146 |
| 2015/0363230 A1* | 12/2015 | Kasahara | ................ | G06F 8/456 718/106 |
| 2016/0147577 A1* | 5/2016 | Artmeier | ................ | G06F 8/451 718/106 |
| 2016/0313991 A1* | 10/2016 | Wei | ........................ | G06F 8/452 |
| 2017/0109216 A1* | 4/2017 | Mineda | .................... | G06F 9/52 |
| 2017/0168790 A1* | 6/2017 | Mineda | .................... | G06F 8/456 |
| 2017/0364341 A1* | 12/2017 | Mineda | .................... | G06F 8/45 |

\* cited by examiner

AUTOMATICALLY DETERMINING DATA DEPENDENCIES TO FACILITATE CODE EXECUTION

TECHNICAL FIELD

The present disclosure relates generally to processing data variables, and in particular, to automatically determining data variable dependencies to facilitate code execution.

BACKGROUND

Determining data dependencies for the purpose of improving code execution performance may be difficult. First, programming logics may need to be considered. For example, in the assignment statement "A=B+C," the variable A depends from the variables B and C, because A's value is assigned based on the values of B and C. As such, A's value cannot be correctly identified unless B and C's values have been. Identifying programming logics embodied in a large amount of source code on-the-fly may be time- and resource-consuming.

Second, specific data storage implementations may also need to be considered. For example, if C's value can only be retrieved through a batch processing job, then reducing the overhead resulting from the real time retrieval of B's value may not result in significant performance improvement.

Third, data processing (e.g., a new value assignment or moving a data object from a centralized SQL database to a HADOOP data server) may render the previously-determined data dependencies inaccurate, requiring constant dependency determination and maintenance.

There is therefore a need for a device, system, and method, which automatically determines data variable dependencies to facilitate code execution.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for automatically determining data variable dependencies to facilitate code execution.

In some implementations, to determine how to efficiently execute a set of programming statements, a computing system may first identify data parameters included in the programming statements. For example, the computing system may parse the syntax of a programming statement to identify the variables (e.g., a JAVA object variable, a SQL data column, an Integer variable) and the constants included in the programming statement. After identifying the data parameters, the computing system may look up an execution statistics database to determine the execution time/latency needed to complete a data operation on a data parameter. For example, the computing system may search an execution history table to determine the response time for retrieving an audio file from a HADOOP database as part of a batch data processing job or to determine the time needed for create a JAVA object and assign values to all necessary properties of the JAVA object.

Based on the determined execution time/latency, the computing system may determine the data dependencies among several programming statements, for example, determining which programming statements may be executed in parallel to each other and which programming statements need to be executed in a particular sequence. In accordance with the determined data dependencies, the computing system can schedule the execution of the programming statement in an efficient manner.

The systems and methods described in the present disclosure can provide a variety of technical advantages.

First, data dependencies can be identified independent of the underlying programming language. For example, when a programming language implements a commonly-recognized programming syntax (e.g., A=B+C, as opposed to A.B.C/+), the data dependencies can be identified, irrespective of the programming language being an object-oriented programing (OOP) language, a structure Query Language (SQL), or a no SQL.

Second, response time/latency for processing a data parameter, e.g., retrieving a 20 MB video file from a HADOOP database or create a JAVA object with 200 properties, may be determined from historic data, without requiring real-time calculation, which reduces real-time processing overhead and shortens response time/latency.

Third, maintenance costs are lowered. For example, when the programming logic of a programming statement changes (e.g., from A=B+C to A=B*C), previously-determined data dependencies can be reused for calculating the new data dependencies, as well as the new response time/latency.

Additional details of implementations are now described in relation to the Figures.

Figure 1:
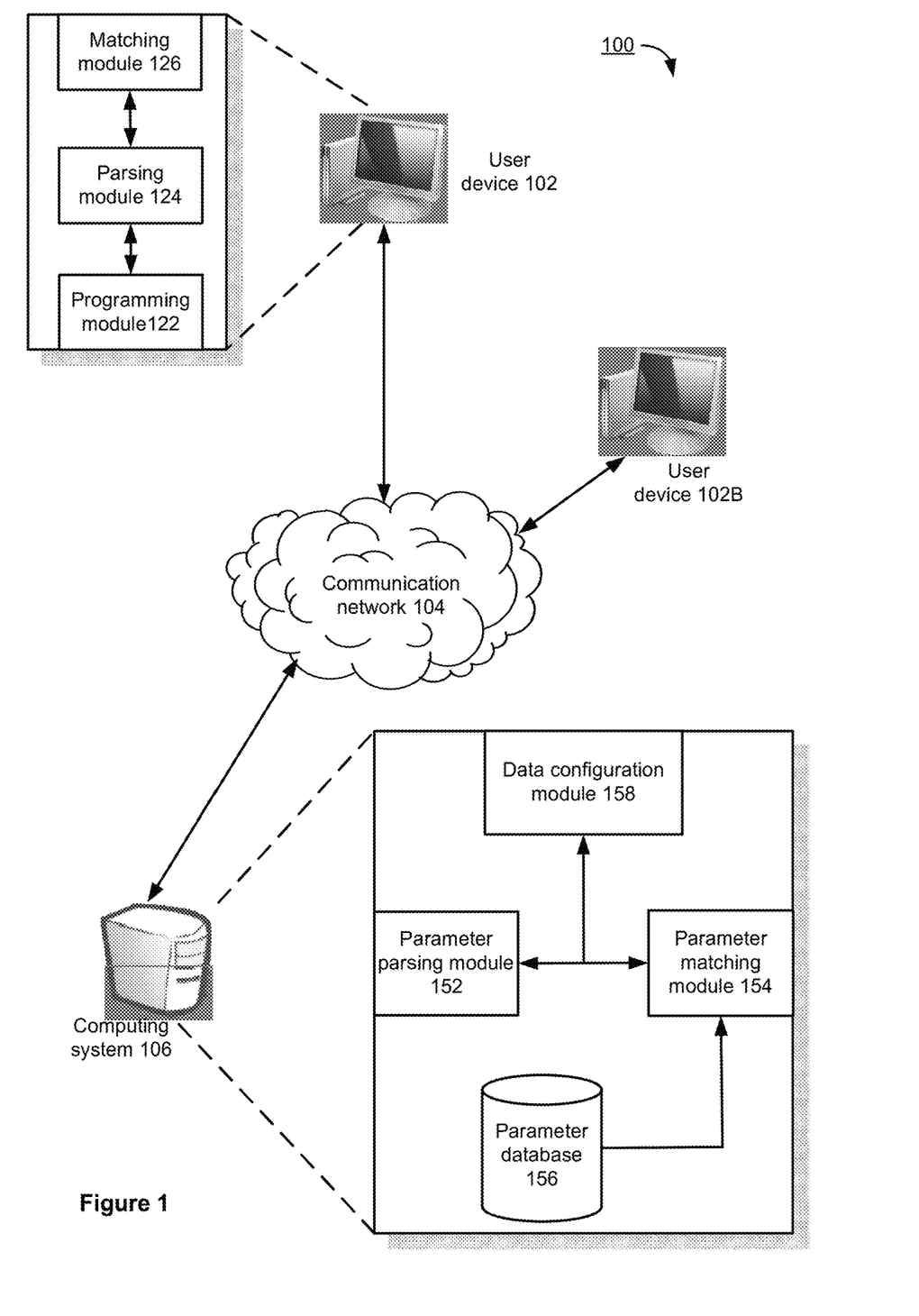
FIG. 1 is a schematic view illustrating an embodiment of a system for automatically determining data variable dependencies to facilitate code execution.

FIG. 1 is a schematic view illustrating an embodiment of a system 100 for automatically determining data variable dependencies to facilitate code execution. The system 100 may comprise or implement a plurality of servers and/or software components that operate to perform various technologies provided in the present disclosure.

As illustrated in FIG. 1, the system 100 may include one or more user devices 102 (e.g., the user device 102 and the user device 102B), and a computing system 106, in communication over a communication network 104. In the present disclosure, a user device may be, but is not limited to, a mobile payment device, a smartphone, a laptop computer, a notebook computer, a mobile computing device, or a desktop computer.

In one embodiment, the user device 102 hosts an Integrated Development Environment (IDE) that provides one or more functionalities to a user (e.g., a data analyst or a software programmer) for software development, as well as code review, execution, and debugging. The IDE may include one or more functional modules, for example, a source code editor, an execution module, a build automation tool, and a debugger, as well as Graphical User Interfaces (GUIs) associated therewith. The IDE may, through one or more GUIs, enable a user to process (e.g., draft, review, and modify) programming statements within various functional modules of the IDE.

The IDE may provide an intelligent code completion feature, which suggests programming statements or data parameters based on a portion of a user provided programming statement or data parameter. For example, if a user is entering the string "Nor," the intelligent code completion feature may determine that the user is trying to enter the data parameter "North_America_sale," and display the string "North_America_sale."

The IDE may provide a data parameter (e.g., a constant or a variable) identification feature, which presents, to a user, the relationship between a user selected data parameter and a different data parameter. For example, when a user selects a JAVA variable "United States" in a JAVA source code editor, the IDE may present a tooltip including the phrase "The 'US' column is the corresponding SQL parameter."

The IDE may also include contain a compiler, interpreter, or both. The IDE may also provide a version control system, a Graphical User Interface (GUI). Some IDEs may also provide a class browser, an object browser, and a class hierarchy diagram, for use in object-oriented software development. The IDE may be one of a NetBeans IDE, an Eclipse IDE, a SharpDevelop IDE, or a Lazarus IDE.

In one embodiment, the user device 102 includes a programming module 122, a parsing module 124, and a matching module 126.

The programming module 122, in one embodiment, enables a user to provide one or more programming statements, e.g., object oriented programming statements (e.g., JAVA and C++ statements), scripting programming statements (e.g., PERL statements, VBSCRIPT statements, and JAVA SCRIPT statements), and/or SQL statements (e.g., MYSQL statements and MS SQL statements). The programming module 122 enables a user to add, modify, and delete user-provided programming statements.

The parsing module 124 may parse programming statements based on a set of parsing rules, e.g., user-provided parsing rules or system-defined parsing rules. The parsing rules may include a syntax-based parsing rule, a semantics-based rule, or both.

For example, based on a user-specified syntax-based parsing rule that variables included in an assignment statement need to be parsed and recognized as separate parameters, but that constants included the assignment statement are not considered as parameters, the parsing module 124 may recognize the assignment statement (A=B+C+1.3) as including the following three parameter "A," "B," and "C," but would not recognize the constant "1.3" as a data parameter.

For another example, based on a system-defined parsing rule that variables (e.g., data parameters whose values may change), but not constants (data parameters whose values may not change, e.g., "90%"), need to be parsed into individual parameters, the parsing module 124 may recognize, from the programming statement "North_America_total_sales=US_total_sales+Canada_total_sales*90%," the following three data parameters "North_America_total_sales," "US_total_sales," and "Canada_total_sales." Here, the parsing module 124 does not recognize the constant "90%" as a data parameter.

As another example, based on a system-specified semantics-based parsing rule that variables included in the primary branch (e.g., the first "IF" branch) of a set of conditional statements needs to be parsed and recognized as separate parameters, but that the secondary branches (e.g., all "else" branches) of the set of conditional statements need not to be parsed and parameters recognized therefrom, the parsing module 124 may recognize the following conditional statement:

IF A>B+C THEN D=B*C
ELSE IF E>10 THEN F++;
ELSE F-- as including the following parameters "A," "B," "C," and "D," because these variables are included in the primary conditional branch. In this example, the parsing module 124 does not recognize the variables "E" and "F" as parameters, because these variables are included in the secondary conditional branches.

The execution module 126, in one embodiment, executes one or more programming statements locally on the user device 102 or causes the one or more programming statements to be executed by the computing system 106 (e.g., the execution engine 158 included therein), or both.

The execution module 126 may determine data dependencies (also referred to as parameter dependencies in the present disclosure) based on parsing results provided by the parsing module 124. For example, based on parameters parsed by the parsing module 124 from a JAVA program, the execution module 126 may determine, e.g., based on historic execution data, the latency for processing each of the parameters, and the required sequence, if any, for processing each of the parameters. For example, if a programming statement requires (1) retrieving values from two different data columns, (2) calculating the total of each column, and (3) calculating the total of two columns combined, the execution module 126 may execute the data retrieval from each column in parallel and compute the total of each column also in parallel, e.g., to reduce total response time, but computing the grand total after both (1) and (2) are completed. For another example, if a programming statement requires the retrieval of two different HADOOP data records from different data nodes, the execution module 126 may execute the HADOOP record retrievals in parallel as part of a same overnight batch execution job, rather than schedule them for execution separately in two overnight jobs.

In one embodiment, the communication network 104 interconnects the user devices 102 and 102B and the computing system 106. In some implementations, the communication network 104 optionally includes the Internet, one or more local area networks (LANs), one or more wide area networks (WANs), other types of networks, or a combination of such networks.

In one embodiment, the computing system 106 parses programming statements, source code files, data sources, or a combination thereof, to identify data parameters (e.g., Integer variables, C++/JAVA objects, and SQL data columns) included therein. The computing system 106 may also identify data dependencies among the identified parameters, for example, determining the latencies of processing the identified parameters, and executing the programming statements in accordance with the identified latencies, so that the execution's response time can be reduced or kept short.

In one embodiment, the computing system 106 includes a parameter parsing module 152, a dependency identification module 154, an execution history database 156, and an execution engine 158.

The parameter parsing module 152, in one embodiment, parses programming statements, source code files, data sources, or a combination thereof and identifies, based on one or more parsing rules, data parameters. For example, the parsing module 124 may recognize the assignment statement (data record A=APPEND (data record B+data record C*2) as including the following three parameter "data record A," "data record B," and "data record C."

The dependency identification module 154 identifies the data dependency of each parameter parsed and identified by the parameter parsing module 152. For example, the dependency identification module 154 may determine that the assignment of parameter A will not complete until the values of parameters B and C are retrieved. Based on the determination that because data record B and data record C are stored on different offline HADOOP data nodes, the data retrievals from which are usually subject to long latencies, the dependency identification module 154 may recommend to the execution module 158 that the retrieval of data records B and C be scheduled at the next available time slots, but that the value assignment of A be scheduled as a low priority execution task (as opposed to attempting to detect a "completion" status of the retrievals of data records B and C every 5 minutes, thereby creating computing overhead), so that other more time-sensitive execution tasks can be allocated computing time and network bandwidth.

The execution history database 156, in one embodiment, stores parameters recognized from different programming languages or data domains and the historic execution performance of each parameter. For example, how long it took to retrieve a 20 MB video file from a HADOOP database; how long it took to retrieve 2000 values for an MS SQL database; and how long it took to search a text file having 3,000,000 characters to identify matching text strings. The historic performance data can be used to predict future performance for similar data operations, which can be used to better schedule the execution of the similar data operations.

The execution engine 158, in one embodiment, executes one or more programming statements, e.g., those provided by the user device 102, on one or more computing devices (e.g., computing servers) associated with the computing system 106. In some implementations, executing a programming statement includes identifying the data dependencies among the data parameters included in the programming statement and processing the data parameters according to the data dependencies.

Figure 2A:
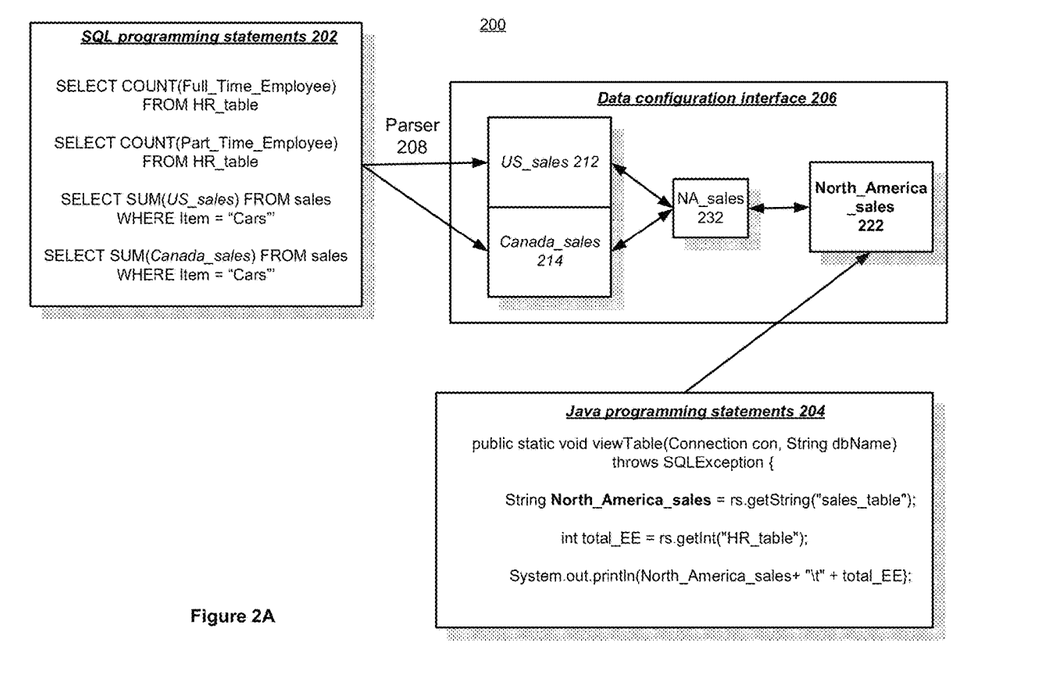
FIG. 2A is a schematic view illustrating an embodiment of a system for automatically determining data variable dependencies to facilitate code execution.

FIG. 2A is a schematic view illustrating an embodiment of a system 200 for automatically determining data variable dependencies to facilitate code execution. The computing system 100, for example, when programmed in accordance with the technologies described in the present disclosure, can be the system 200.

The system 200 includes a user device 102 and a computing system 106, which may in turn include an execution system 220.

The user device 102 may enable a user to provide one or more programming statements 202 and to cause the programming statements to be executed by the computing system 106. As shown in FIG. 2A, for example, a user may attempt to execute different types of programming statements on the computing system 102, for example, a SQL statement ("SELECT COUNT(FT_employee) FROM HR_table") 204, a JAVA assignment statement ("Vehicle A.engine_specification.engine=CarB.engine 206") 206, and a Integer assignment statement ("G=ZY−ZK") 208.

After receiving the programming statements 204, 206, and 208 as part of a program execution request from the user device 102, the computing system 106 may first try to identify the data parameters (or data expressions) included in the programming statements 204, 206, and 208. A data expression may include one or more data parameters and one or more data operands, for example, A=B, A=B+C, B+C, and B.

As shown in FIG. 2A, for example, the computing system 106 may use the parameter parsing module 152 to identify parameters 210 from the programming statements 202.

For example, as a user is completing, e.g., word-by-word, the SQL statement "SELECT COUNT(FT_employee) FROM HR_table," the parameter parsing module 152 may, based on one or more parsing rules, identify data parameters as they appear. For example, when the user is typing the word "SELECT," the parameter parsing module 152 determines that the word "SELECT" matches the name of a system-defined SQL function, rather than that of a user-provided data parameter (e.g., a variable), and thus does not attempt to identify a data dependency for the word "SELECT." A similar process may take place as the user is entering the words "COUNT" and "FROM," which are both system-defined SQL functions.

When the user is entering the phrase "FT_employee," however, the parameter parsing module 152 determines that the phrase "FT_employee" is not among the system-defined SQL keywords or functions. Based on this determination, the parameter parsing module 152 identifies the phrase "FT_employee" as a user-provided data parameter 212. Similar processes may take place for the JAVA statement 206 and the Integer statement 208, and the parameter parsing module 152 may identify the following parameters "A.engine_specification.engine" 214 and "G" 216, as well as "CarB.engine," "ZY," and "ZK."

After identifying the parameters 212, 214, and 216, the computing system 106 may try to determine the parameter dependencies, e.g., in order to optimize the execution of the programming statements 204, 206, and 208. For example, the computing system 106 may determine that the parameter "FT_employee" 212 is stored in an online database, e.g., the SQL database 224 and the vehicle object "A" and the Integer parameter "G" are stored in an offline database, e.g., the Hadoop data node 222.

Further, based on execution statistics stored in the execution history database 156, the computing system 106 may determine that storing and retrieving data onto and from the SQL database 224 may be subject to a very low latency (e.g., 0.5 seconds), while storing and retrieving data onto and from the Hadoop data node 222 may be subject to an increased latency (e.g., 20 seconds). Based on these latency determinations, the computing system 106 may execute the programming statements 206 and 206 before executing the programming statement 204, e.g., to avoid a prolonged execution time.

Figure 2B:
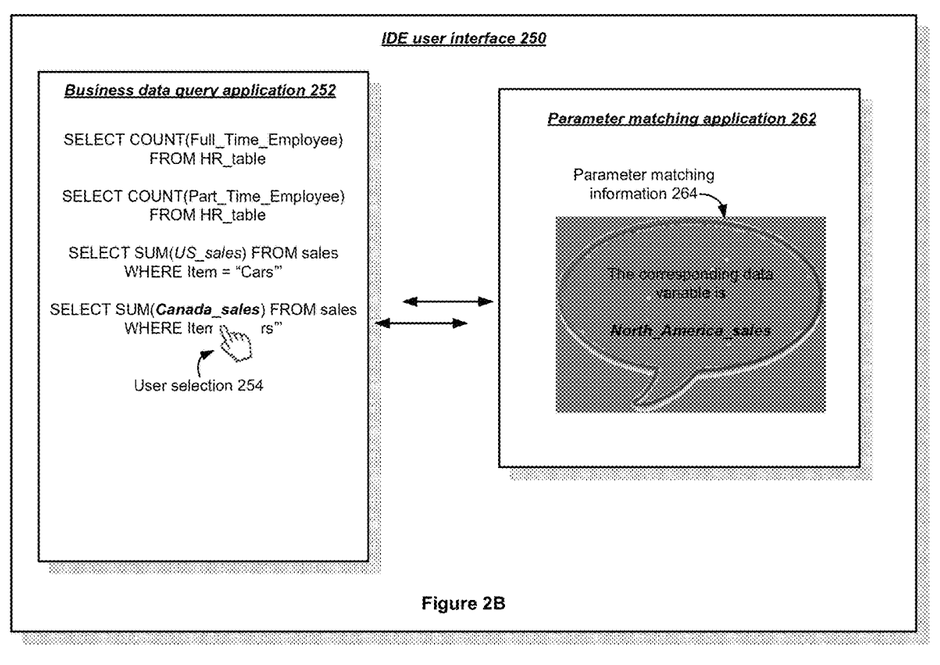
FIG. 2B is a schematic view illustrating an embodiment of a method for automatically determining data variable dependencies to facilitate code execution.

FIG. 2B is a schematic view illustrating an embodiment of a method 250 for automatically determining data variable dependencies to facilitate code execution. The computing system 106, for example, when programmed in accordance with the technologies described in the present disclosure, can execute the method 250.

As shown in FIG. 2B, user-provided computer programs may be stored in a database or an IDE. The programming statement 202 may include, a SQL statement ("SELECT COUNT(FT_employee) FROM HR_table") 204, a JAVA assignment statement ("Vehicle A.engine_specification.engine=CarB.engine 206") 206, and a data processing statement ("Complete_Audio=Append (Audio_file_1; Audi_file_2)") 258.

The computing system 106 may identify parameters from the programming statements 204, 206, and 258, for example, the parameter "FT_employee" 212, the vehicle object A 214, and the parameters "Audio_file_1" and "Audio_file_2."

The computing system 106 may identify the data dependency for each parameter by querying historic execution data of a similar or same operation on a selected parameter. For example, the computing system 106 may apply a hash function to a selected parameter to locate the location to which the historic execution data for the selected parameter is stored in the execution history database 156. For example, for a Hash_function (FT_employee)=[row 0001, column 0001]. the values stored in the row 0001 and column 0001 specify that the parameter "FT_employee" is stored in a SQL database and retrieving a value from the FT_employee column previously took approximately 0.1 second.

Similarly, as shown in FIG. 2A, for the Hash_function (vehicle object A)=[row 0003, column 0002], the values stored in the row 0003 and column 0002 specify that the parameter "vehicle object A" is a JAVA variable and assigning values to a vehicle object previously took about 10 seconds to complete. As also shown in FIG. 2A, the Hash_function (Audio_file_1)=[row 0004, column 0003] and the Hash_function (Audio_file_1)=[row 0003, column 0045], which specify that the parameter "Audio_file_1" is a HADOOP data record and a previous retrieval of the Audio_file_1" record took approximately 1.5 minutes and that the parameter "Audio_file_2" is also a HADOOP data record and a previous retrieval of the Audio_file_2" record took approximately 1.3 minutes, respectively.

In some implementations, the hash function used to identify execution latency of a parameter is a perfect hash function, which uniquely identifies a row-column location at which historic execution data about the parameter is stored in the execution history database 156.

Figure 3:
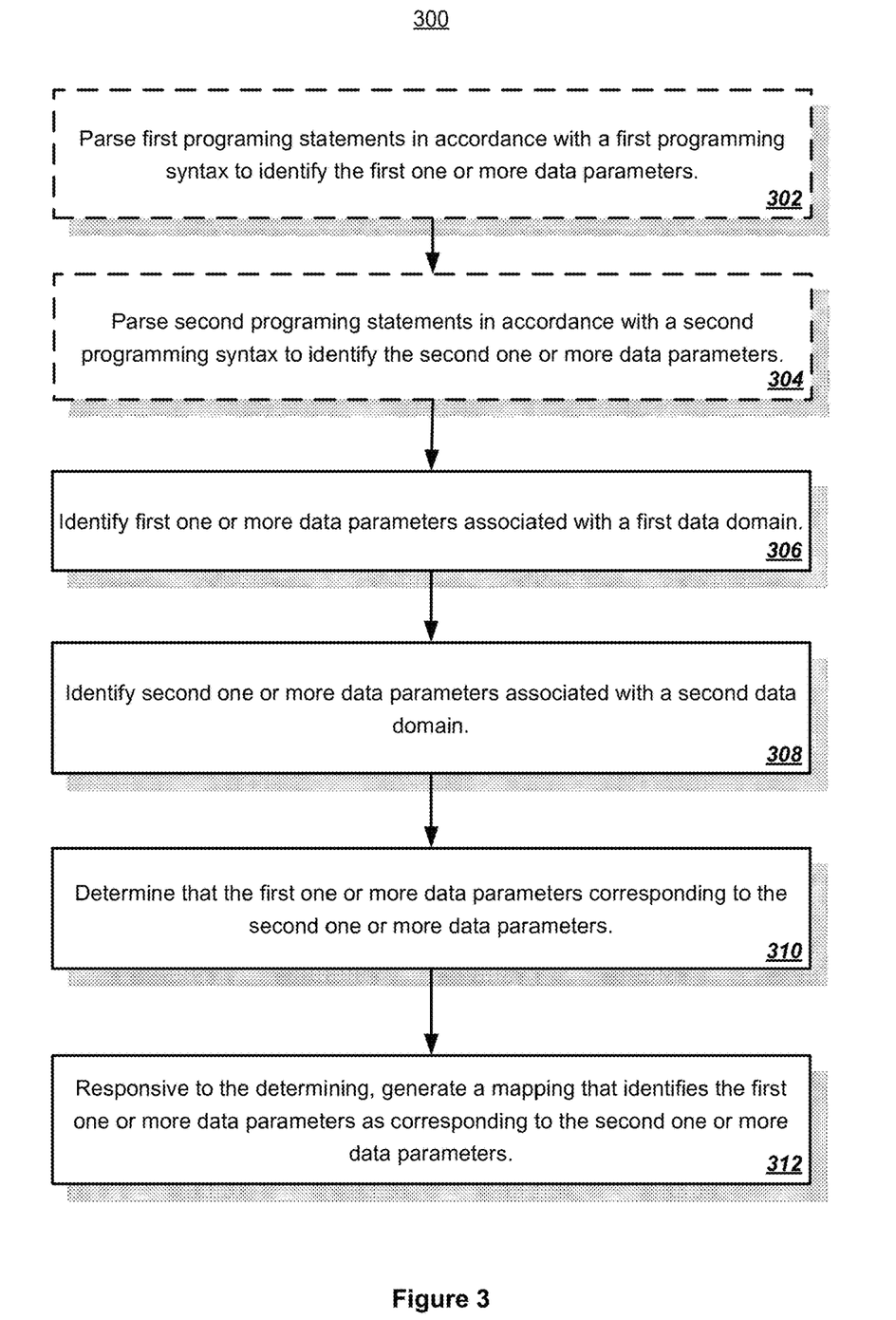
FIG. 3 is a flow chart illustrating an embodiment of a method for automatically determining data variable dependencies to facilitate code execution.

FIG. 3 is a flow chart illustrating an embodiment of a method 300 for automatically determining data variable dependencies to facilitate code execution. The computing system 106, for example, when programmed in accordance with the technologies described in the present disclosure, can perform the method 300.

The method 300 may include identifying (302) a set of programming statements having a plurality of data parameters; identifying (304) first data parameters associated with a first programming statement in the set of programming statements; determining (306) one or more parameter dependencies associated with the first data parameters; and determining (308), based on the one or more parameter dependencies, a first execution performance of the first programming statement.

In some implementations, the execution performance of multiple programming statements are considered, e.g., to better schedule the execution of the multiple programming statements. The method 300 may therefore include determining (310) a second execution performance of the second programming statement. The method 300 may also include scheduling (312) execution of the first programming statement and of the second programming statement based on the first execution performance and second execution performance.

For example, as explained with reference to FIG. 2B, the latencies of executing different programming statements are considered in order to optimize the execution of the programming statement 202.

The method 300 may also include parsing the first programming statement based on one or more parsing rules to identify the first data parameters. Parsing rules may include at least one of a syntax-based parsing rule, a semantics-based parsing rule, a system-provided parsing rule, and/or a user defined parsing rule.

In some implementations, an offline code parsing feature is provided. For example, source code of several computer programs may be scanned or parsed, in parallel or in sequence, based on parsing rules to identify user-defined data parameters as part of an off-line batch job execution. For example, an IDE may, as part of an overnight batch job, scan all existing user-provided computer programs, e.g., stored under a particular file directory, to identify user-defined data parameters within and try to identify matching relationship among the identified data parameters.

In other implementations, an on-demand code parsing feature is provided. For example, when a user is requesting a spell check of 100 lines of SQL programming statements, the computing system 106 may, as part of the user-requested spell check, parse the 100 lines of SQL programming statements to identify parameters that have not been determined as having no matching parameter in a frontend JAVA program (e.g., which queries at least one common data table against which the SQL programming statements also query). The computing system 106 may identify any matching JAVA parameters and present the matching relationship to the user, so that the user can either confirm and have such a mapping stored in the parameter database 156 for future reference or disapprove proposed matching relationship and have the user feedback taken into account for the purpose of identifying future matching parameter. For example, a user, after disapproving a system-proposed matching relationship (e.g., the JAVA parameter "CA_sales' matches the SQL parameter "Canada_sales"), may provide a parameter-matching rule that the phrase "CA" should not be matched to "Canada," but to "California" or "Cali." The computing system 106 may take this newly-added rule into account when determining whether the JAVA parameter "CA_cost' matches the SQL parameter "Canada_cost" or "California_cost."

In some implementations, the parsing rules are independent of a specific programming language. For example, a parsing rule may be based on a commonly-recognized syntax of a programming statement or the naming convention of a variable. For example, a commonly-accepted syntax for an assignment statement may dictate the following syntax A=B+C, with (1) the variable A being the value assignee, (2) the variables B and C being the value assignors, and (3) the operand ("+") being located between the variables B and C. For another example, a commonly-accepted variable naming convention may dictate that if a variable's name starts with the phrase "int," then the variable is of the Integer type and that if a variable's name starts with the phrase "HDP," then the variable is a HADOOP data record. The computing system 106 may determine, based on these parsing rules, that words or phrases in a programming are a user-provided parameter and the type information of that variable.

Parallel execution of several programming statements are enabled in some implementations. Scheduling execution of the first programming statement and the second programming statement may therefore include executing at least a portion of the first programming statement in parallel to executing the second programming statement.

For example, as shown in FIG. 2B, because the SQL statement 202 and the JAVA statement 204 have similar latencies, they can be executed in parallel to reduce overall latency. Executing the SQL statement 202 and the JAVA statement 204 in parallel with each other may provide a total latency of 1 minute, which is an improvement from the total latency of 70 seconds when the SQL statement 202 and the JAVA statement 204 are executed sequentially.

Sequential execution of several programming statements is enabled on an as-needed basis, in some implementations. Scheduling execution of the first programming statement and the second programming statement may therefore include executing the first programming statement and the second programming statement in a predefined sequence.

For example, when two variables must be accessed in a predefined order (e.g., A first, B second), the execution of the programming statements relating to these variables may need to be executed in the predefined order, although the execution of these programming statements can still be optimized (e.g., by way of parallel execution) with programming statements that do not involve these variables.

A hash function may be used to locate the history execution data of a given parameter, e.g., to reduce administrative overhead, as hash functions can provide direct data access. Determining one or more parameter dependencies associated with the first data parameters may therefore include: identifying, based on a hash function, a parameter dependency associated with a data parameter in the first data parameters.

In some implementations, data dependencies for user-defined parameters and functions may be provided. For example, a user may specify the latency for processing a user-defined variable or executing a user-defined function in the execution table and the computing system, when identifying a user-defined variable or function, can access the execution history database to identify the required latency information. The method 300 may therefore include determining the first programming statement as including a user-defined function; and selecting a user-defined dependency associated with the first programming statement for inclusion into the one or more parameter dependencies.

In some implementation, an example method for automatically determining data variable dependencies to facilitate code execution may include identifying a set of programming statements having a plurality of data parameters; identifying first data parameters associated with a first programming statement in the set of programming statements; identifying second data parameters associated with a second programming statement in the set of programming statements; determining one or more parameter dependencies associated with the first data parameters and with the second data parameters; and determining, based on the one or more parameter dependencies, an execution performance of the set of programming statements.

When a programming statement calls for an off-line execution, data injection techniques may be used to determine the latency of the offline execution. The first programming statement includes a programming statement for an off-line execution and wherein determining one or more parameter dependencies associated with the first data parameters includes executing a dependency injection function associated with the programming statement.

A data injection technique, when invoked, automatically constructs one or more programming statements needed for a required offline data processing. The program invoking the offline execution does not need to know about the injecting code. Nor does the program need to specify how to construct the services. Nor does the program need to know which one or more programming statements are actually needed. The program only needs to know about the Application Program Interface (API) of the offline execution requested. In these situations, therefore, the data dependencies are provided by the data injection technique, rather than from the execution history database 156.

In some implementations, the data dependencies of constants are not calculated, for example, because the constants are over loaded in a memory buffer for ease of access. The method 300 may therefore include excluding one or more constants from the first data parameters to identify one or more variables; and determining a parameter dependency associated with the one or more variables. For example, in the programming statements record A=record B+1, the constant "1" is excluded from calculating the parameter dependency, as the latency for accessing the constant "1" may be computationally negligible, due to its in-buffer location.

Determining one or more parameter dependencies associated with the first data parameters includes determining a parameter dependency based on a type (e.g., an Integer or a Hadoop record) associated with a data parameter in the first data parameters.

In some implementation, an example method for automatically determining data variable dependencies to facilitate code execution may include identifying a set of programming statements having a plurality of data parameters; identifying first data parameters associated with a first programming statement in the set of programming statements; identifying second data parameters associated with a second programming statement in the set of programming statements; determining one or more parameter dependencies associated with the first data parameters and with the second data parameters; and determining, based on the one or more parameter dependencies, an execution schedule of the first programming statement and the second programming statement.

Figure 4:
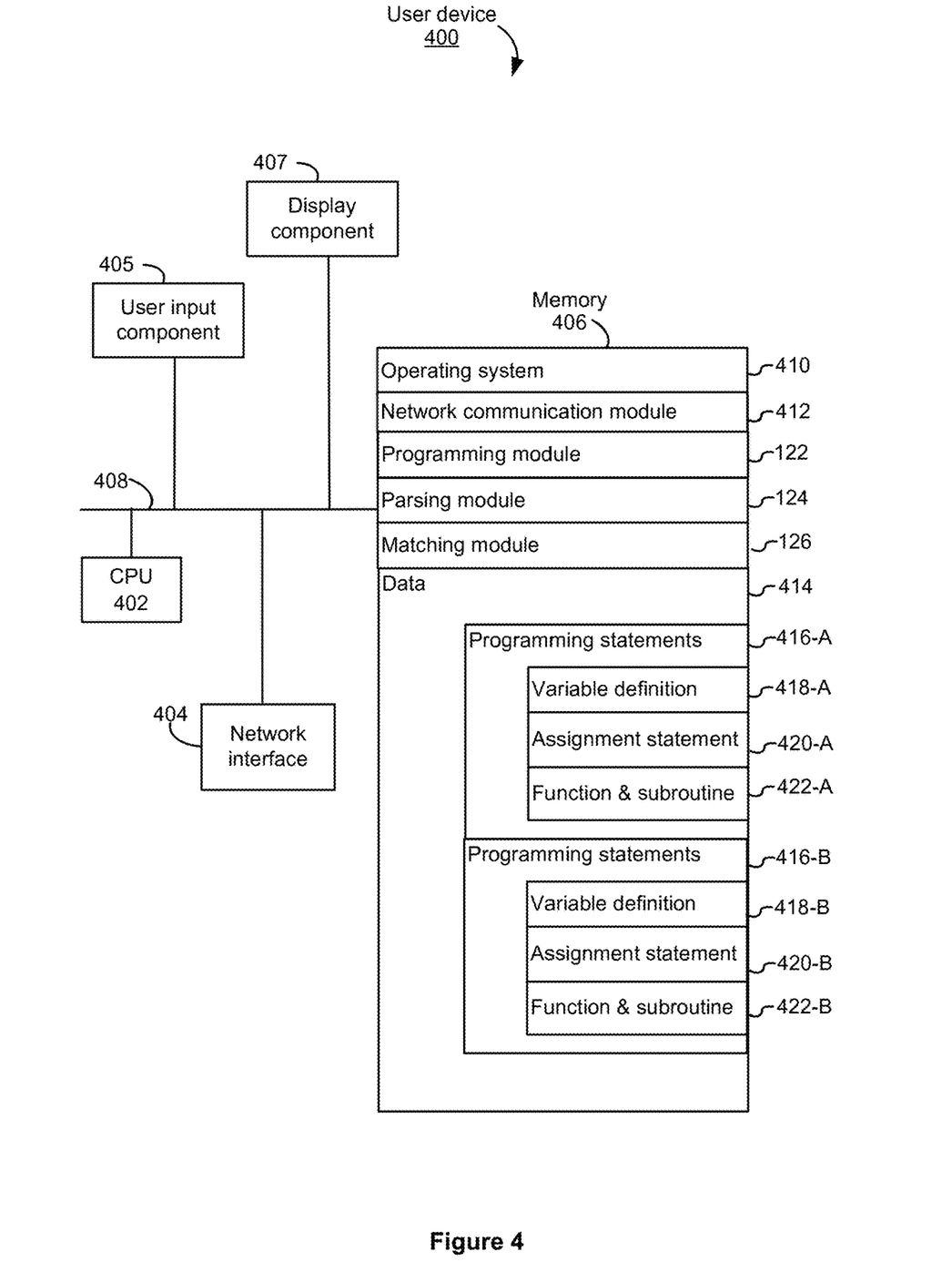
FIG. 4 is a schematic view illustrating an embodiment of a user device.

FIG. 4 is a schematic view illustrating an embodiment of a user device 400, which can be the device 102 shown in FIG. 1. The device 400 in some implementations includes one or more processing units CPU(s) 402 (also referred to as hardware processors), one or more network interfaces 404, a memory 406, and one or more communication buses 406 for interconnecting these components. The communication buses 406 optionally include circuitry (sometimes called a chip set) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:
- an operating system 410, which includes procedures for handling various basic system services and for performing hardware dependent tasks;
- a network communication module (or instructions) 412 for connecting the device 400 with other devices (e.g. another device 400 or the computing system 106) via one or more network interfaces 404 (wired or wireless) or via the communication network 104 (FIG. 1);

the programming module 122 for enabling, e.g., via an IDE, a user to provide one or more programming statements, e.g., object oriented programming statements (e.g., JAVA and C++ statements), scripting programming statements (e.g., PERL statements, VBSCRIPT statements, and JAVA SCRIPT statements), SQL statements (e.g., MYSQL statements and MS SQL statements);

the parsing module 124 for parsing programming statements based on parsing rules, e.g., user-provided parsing rules or system-defined parsing rules;

the execution module 126 for executing one or more programming statements locally on the user device 102 or remotely on the computing system, or both; and data 414 stored on the device 400, which may include:
- a first set of programming statements 416A (e.g., 10 lines of VB SCRIPT source code), which may include:
  - one or more variable definitions (e.g., INT variable, which identifies the variable A as having the Integer type);
  - one or more assignment statements (e.g., A=C+B); and
  - one or more functions or subroutines (e.g., INT Cal_Addition (input 1, input 2, output_total, which identifies the function Cal_Addition as having two inputs and an output having an Integer type); and
- a second set of programming statements 416B (e.g., 20 lines of C source code), which may include:
  - one or more variable definitions (e.g., char variable_B, which identifies the variable B as having the character type);
  - one or more assignment statements (e.g., JK=4B*7A); and
  - one or more functions or subroutines (e.g., number Cal_Multiple (input 1, input 2, output_total, which identifies the function Cal_ Multiple as having two inputs and an output having a real number type).

The device 400 may also include a user input component 407 for enabling a user to interact with (e.g., providing input to) the device 400. In some implementations, the user input component 407 may be a keyboard, a mouse, a touchpad, a track pad, or a touch screen. The device 400 may further include a display component 407 for presenting information, e.g., source code, programming statement, or any other information in an IDE, to a user.

In some implementations, one or more of the above identified elements are stored in one or more of the previously mentioned memory devices, and correspond to a set of instructions for performing functions described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 may store additional modules and data structures not described above.

Figure 5:
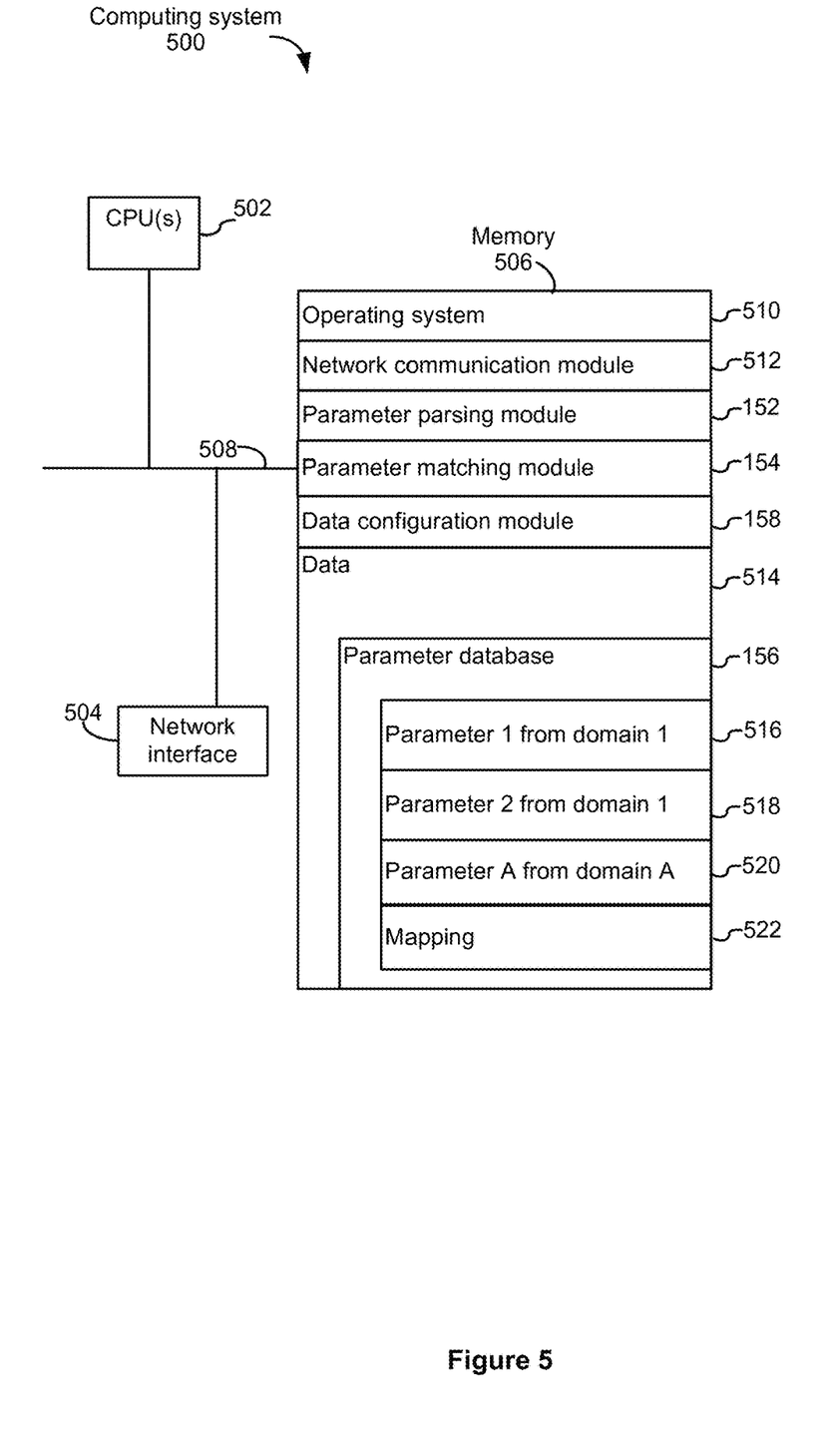
FIG. 5 is a schematic view illustrating an embodiment of a computing system.

FIG. 5 is a schematic view illustrating an embodiment of a computing system 500, which can be the computing system 106 shown in FIG. 1. The system 500 in some implementations includes one or more processing units CPU(s) 502 (also referred to as hardware processors), one or more network interfaces 504, a memory 506, and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

- an operating system 510, which includes procedures for handling various basic system services and for performing hardware dependent tasks;
- a network communication module (or instructions) 512 for connecting the system 500 with other devices (e.g., the user devices 102 and 102B) via one or more network interfaces 504;
- the parameter parsing module 152 for parsing programming statements, source code files, data sources, or a combination thereof and identifies, based on one or more parsing rules, data parameters;
- the dependency identification module 154 for identifying the data dependency of each parameter parsed and identified by the parameter parsing module 152;
- the execution engine 158 for executing one or more programming statements on one or more computing devices (e.g., computing servers) associated with the computing system 500; and
- data 514 stored on the system 500, which may include:
  - the execution history database 156 for storing parameters recognized from different programming languages or data domains and the historic execution performance of each parameter, which may include:
    - one or more parsed expressions or data parameters 516; and
    - a hash value 518 that uniquely identifies, for a given parsed expression, a set of execution statistics 520.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 506 optionally stores a subset of the modules and data structures identified above. Furthermore, the memory 506 may store additional modules and data structures not described above.

Although FIGS. 4 and 5 show a "user device 400" and a "computing system 500" and respectively, FIGS. 4 and 5 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
receiving a programming code associated with an application for execution by the system, wherein the programming code comprises at least a first programming statement and a second programming statement;
determining that the first programming statement comprises a first dependency of a first variable and that the second programming statement comprises a second dependency of a second variable;
identifying, among a plurality of databases, a first database that stores first data corresponding to the first variable;
identifying, among the plurality of databases, a second database that stores second data corresponding to the second variable;
determining a first estimated time for accessing data from the first database by retrieving, from a stored table external to the application, execution statistics data associated with the first database based on the first variable;
determining that the second database is offline and thereby inaccessible by the programming code based on an attempt to execute the second programming statement;
in response to determining that the second database is inaccessible by the programming code, injecting, into the programming code, one or more programming statements for executing a batch data retrieval process;
determining a second estimated time for accessing the second data from the second database in the batch data retrieval process based at least on a data type and a data size associated with the second data and by executing a function that simulates an offline execution associated with retrieving the second data from the second database;
determining, based on the first estimated time and the second estimated time, an execution order for executing the programming code; and
executing a first instruction for retrieving the second data from the second database prior to executing a second instruction for retrieving the first data from the first database according to the determined execution order.

2. The system of claim 1, wherein the determining that the first programming statement comprises the first dependency comprises parsing the first programming statement based on one or more parsing rules to identify the first variable.

3. The system of claim 2, wherein the one or more parsing rules include at least one of a syntax-based parsing rule, a semantics-based parsing rule, a system-provided parsing rule, or a user defined parsing rule.

4. The system of claim 2, wherein the one or more parsing rules include a parsing rule that is independent of a specific programming language.

5. The system of claim 1, wherein the programming code further comprises a third programming statement, wherein the operations further comprise:
determining that the third programming statement comprises a third dependency of a third variable; and
determining, among the plurality of databases, that the second database stores third data corresponding to the third variable, wherein the one or more programming statements injected into the programming code specifies that the third data, along with the second data, is retrieved from the second database in the batch data retrieval process, and wherein the execution order further indicates that the second instruction and the third instruction are executed in parallel based on determining that both of the second programming statement and the third programming statement require data retrieval from the second database.

6. The system of claim 1, wherein the determining the first estimated time comprises:
retrieving, from a stored table external to the application, execution statistics data associated with the first database based on the first variable.

7. The system of claim 1, wherein the determining that the second programming statement comprises the second dependency comprises:
parsing the second programming statement; and
identifying a user-defined function based on the parsing, wherein the user-defined function comprises the second variable.

8. The system of claim 1, wherein the determining the first second estimated time comprises executing a function to simulate an execution of the one or more programming statements associated with the offline batch data retrieval process to estimate a time required to retrieve data from the first second database.

9. The system of claim 7, wherein the execution order indicates that the user-defined function included in the second programming statement is delayed for a predetermined amount of time based on the determining that the second database is inaccessible.

10. The system of claim 1, wherein the programming code further comprises a third programming statement, wherein the operations further comprise:
    determining that the third programming statement comprises a third dependency of a third variable;
    determining, from the plurality of databases, that the second database that stores third data source corresponding to the third variable; and
    modifying the one or more programming statements to include a programming statement for retrieving the third data from the second database in the offline batch data retrieval process.

11. A method, comprising:
    obtaining, by one or more hardware processors, a programming code associated with an application for execution, wherein the programming code comprises at least a first programming statement and a second programming statement;
    determining, by the one or more hardware processors, that the first programming statement comprises a first dependency of a first variable and that the second programming statement comprises a second dependency of a second variable;
    identifying, by the one or more hardware processors among a plurality of databases, a first database that stores first data corresponding to the first variable;
    generating a first instruction for retrieving the first data from the first database;
    identifying, by the one or more hardware processors among the plurality of databases, a second database that stores second data corresponding to the second variable;
    determining that the second database is offline and thereby inaccessible by the programming code based on an attempt to execute the second programming statement;
    generating a second instruction for retrieving the second data from the second database in an offline batch data processing job;
    in response to determining that the second database is offline and inaccessible injecting the first instruction and the second instruction into the programming code;
    determining, by the one or more hardware processors, a first estimated time for accessing data from the first database by retrieving, from a stored table external to the application, execution statistics data associated with the first database based on the first variable;
    determining a second estimated time for accessing the second data form the second databased in the offline batch data processing job based at least on a data type and a data size associated with the second data and by executing a function that simulates an offline execution associated with retrieving the second data from the second database;
    determining, by the one or more hardware processors based on the first estimated time and the second estimated time, an execution sequence for executing the first and second instructions, wherein the execution sequence specifies that the second instruction is executed before the first instruction; and
    executing, by the one or more hardware processors, the second instruction prior to executing the first instruction according to the determined execution sequence.

12. The method of claim 11, wherein the determining the second estimated time comprises executing a function that simulates an off-line execution associated with retrieving the second data from the second database.

13. The method of claim 11, wherein the determining that the first programming statement comprises the first dependency comprises:
    parsing the first programming statement;
    identifying, based on the parsing, a third instruction; and
    determining that the third instruction comprises a function for assigning a value to a third variable, wherein the value is determined based on the first variable.

14. The method of claim 11, wherein the determining the first estimated time comprises obtaining statistics data associated with retrieving data from the first database from a table external to the application.

15. The method of claim 13, wherein the execution sequence further specifies that the third instruction is delayed for a predetermined amount of time based on the determining that the third instruction comprises a function that depends on the first variable.

16. The method of claim 11, wherein the programming code comprises a third programming statement, wherein the method further comprises:
    determining that the third programming statement comprises a third dependency of a third variable;
    identifying, among the plurality of databases, a third database that stores third data corresponding to the third variable;
    generating a third instruction for retrieving the third data from the third database; and
    determining a third estimated time for accessing data from the third database, wherein the execution sequence further specifies that the third instruction is executed after the first and second instructions based on the third estimated time.

17. A non-transitory machine-readable medium having stored thereon machine-readable instructions executable to cause a machine to perform operations comprising:
    receiving a programming code associated with an application for execution by the machine, wherein the programming code comprises at least a first programming statement and a second programming statement;
    determining that the first programming statement comprises a first dependency of a first variable and that the second programming statement comprises a second dependency of a second variable;
    identifying, among a plurality of databases, a first database that stores first data corresponding to the first variable;
    identifying, among the plurality of databases, a second database that stores second data corresponding to the second variable;
    determining a first estimated time for accessing data from the first database by retrieving, from a stored table external to the application, execution statistics data associated with the first database based on the first variable;
    determining that the second database is offline and thereby inaccessible by the application based on an attempt to execute the second programming statement;
    in response to determining that the second database is inaccessible by the application, injecting, into the programming code, one or more programming statements configured to execute a batch data retrieval process;

determining a second estimated time for accessing the second data from the second database in the batch data retrieval process based at least on a data type and a data size associated with the second data and by executing a function that simulates an offline execution associated with retrieving the second data from the second database; and determining, based on the first estimated time and the second estimated time, an execution schedule for executing the programming code, wherein the execution schedule specifies that a first instruction for retrieving the first data from the first database is executed after a second instruction for retrieving the second data from the second database; and executing the programming code according to the determined execution schedule.

18. The non-transitory machine-readable medium of claim 17, wherein the determining the first estimated time comprises:

retrieving, from a stored table external to the application, execution statistics data associated with the first database based on the first variable.

19. The non-transitory machine-readable medium of claim 17, wherein the determining the first-second estimated time comprises executing a function to simulate an execution of the one or more programming statements associated with the offline batch data retrieval process to estimate a time required to retrieve data from the first second database.

20. The non-transitory machine-readable medium of claim 17, wherein the operations further comprise:

determining that the second programming statement includes a third instruction that depends on the second variable, wherein the execution schedule further specifies that the third instruction of the second programming statement is executed after the first and second instructions based on the determining that the third instruction depends on the second variable.

* * * * *